United States Patent [19]
Bonner, Jr. et al.

[11] Patent Number: 5,254,400
[45] Date of Patent: Oct. 19, 1993

[54] MICROCELLULAR AND ULTRAMICROCELLULAR MATERIALS CONTAINING HYDROFLUOROCARBON INFLATANTS

[75] Inventors: Willard H. Bonner, Jr., Bath, Me.; Lun Y. Wei, Hockessin, Del.

[73] Assignee: E. I. du Pont de Nemours and Company, Wilmington, Del.

[21] Appl. No.: 687,057

[22] Filed: Apr. 18, 1991

[51] Int. Cl.$^5$ .................. B32B 3/26; B32B 27/36; C08J 9/14

[52] U.S. Cl. ..................... 428/305.5; 264/53; 428/315.5; 428/364; 428/480; 521/79; 521/131; 521/142; 521/182

[58] Field of Search .............. 428/304.4, 305.5, 315.5, 428/364, 480, 500; 521/79, 98, 131, 142, 182

[56] References Cited

U.S. PATENT DOCUMENTS

| | | | |
|---|---|---|---|
| 3,227,664 | 1/1966 | Blades et al. | 521/144 |
| 3,227,784 | 1/1966 | Blades et al. | 264/53 |
| 3,375,211 | 3/1968 | Parrish | 521/98 |
| 3,375,212 | 3/1968 | Bonner | 521/182 |
| 3,381,077 | 4/1968 | Bonner | 264/321 |
| 3,485,711 | 12/1969 | Fish et al. | 428/195 |
| 3,730,916 | 5/1973 | Etchells | 521/55 |
| 3,743,694 | 7/1973 | Cichelli et al. | 264/343 |
| 4,806,293 | 2/1989 | Akiyama et al. | 264/53 |
| 4,972,002 | 11/1990 | Volkert | 521/120 |
| 4,997,706 | 3/1991 | Smits et al. | 428/304.4 |

FOREIGN PATENT DOCUMENTS

| | | |
|---|---|---|
| 345580 | 5/1989 | Fed. Rep. of Germany . |
| 2-265933 | 10/1990 | Japan . |
| 2-294344 | 12/1990 | Japan . |

OTHER PUBLICATIONS

P S. Zurer, "Search Intensifies for Alternatives to Ozone-Depleting Halocarbons", C & E News, 8 Feb. 1988, pp. 17-20.

"Alternatives to Fully Halogenated Chlorofluorocarbons", Du Pont Dev. Prog., *Du Pont Fluorocarbon/Ozone Update*, Wilm., DE, Mar. 1987.

"New Du Pont Position Stresses Orderly Transition to Alternatives", *Du Pont Fluorocarbon/Ozone Update*, Wilm. Del., Jul. 1988.

*Primary Examiner*—George F. Lesmes
*Assistant Examiner*—Christopher Brown

[57] ABSTRACT

Improved microcellular and ultramicrocellular materials containing hydrofluorocarbon (HFC) inflatants are disclosed. The inflatants are environmentally more favorable than fully halogenated chlorofluorocarbons (CFCs).

6 Claims, No Drawings

MICROCELLULAR AND ULTRAMICROCELLULAR MATERIALS CONTAINING HYDROFLUOROCARBON INFLATANTS

BACKGROUND OF THE INVENTION

1. Field of the Invention

The present invention relates to improved microcellular and ultramicrocellular polymeric materials containing hydrofluorocarbon (HFC) inflatants. These environmentally more favorable inflatants have zero potential to deplete the earth's stratospheric ozone layer and substantially lower global warming potential than fully halogenated chlorofluorocarbons (CFCs).

2. Description of the Prior Art

The term, "microcellular", as used herein, means a synthetic organic polymeric structure having the following general properties: 1) substantially all of the polymer is present as closed polyhedral shaped cells defined by film-like cell walls having a thickness of less than 2 micrometers, preferably less than 0.5 micrometers, and 2) the cell walls have a substantially uniform thickness and density.

The term, "ultramicrocellular", as used herein, means a crystalline synthetic organic polymeric structure having the following general properties: 1) substantially all of the polymer is present as closed polyhedral shaped cells defined by film-like cell walls having a thickness of less than 2 micrometers, preferably less than 0.5 micrometers, 2) the cell walls have a substantially uniform thickness and density, 3) there is a uniform crystalline polymer orientation, and 4) there is a uniplanar crystalline polymer orientation. These ultramicrocellular structures and processes for producing such structures are further described in Blades and White, U.S. Pat. Nos. 3,227,664 and 3,227,784.

Parrish, U.S. Pat. No. 3,375,211 discloses ultramicrocellular polymeric structures containing an inflatant which has a permeability coefficient for diffusion through the cell walls less than air. The inflatant is capable of generating a vapor pressure of at least 30 mm Hg at a temperature below the softening point of the polymer. The patent discloses suitable inflatants as those selected from the group consisting of sulfur hexafluoride and saturated aliphatic and cycloaliphatic compounds having at least one fluorine to carbon covalent bond, and wherein the number of fluorine atoms exceeds the number of carbon atoms. Preferably, the saturated aliphatic and cycloaliphatic compounds are, respectively, perhaloalkanes and perhalocycloalkanes in which at least 50% of the halogens are fluorine. Specific examples of suitable inflatants include chlorotrifluoromethane, dichlorodifluoromethane, 1,1,2-trichloro-1,2,2-trifluoroethane, symmetrical - dichlorotetrafluoroethane, and perfluorocyclobutane among others.

Bonner, U.S. Pat. No. 3,375,212, discloses preparing microcellular structures composed of a high molecular weight, synthetic organic polymer having a glass transition temperature of at least 40° C. These structures contain the inflatants described in the aforementioned U.S. Pat. No. 3,375,211. The patent includes an example of producing poly(vinyl chloride) microcellular fiber containing the inflatant, perfluorocyclobutane.

Although fully halogenated chlorofluorocarbon compounds have been very effective inflatants, there is concern that the release of such compounds into the atmosphere may be a factor in the depletion of earth's stratospheric ozone layer. Furthermore, these compounds may be a source of global warming. (See, P. S. Zurer, "Search Intensifies for Alternatives to Ozone-Depleting Halocarbons," *Chemical & Engineering News*, 8 February 1988, pp. 17–20).

The present invention is concerned with providing microcellular and ultramicrocellular polymeric materials containing environmentally more favorable inflatants which have zero potential to deplete the earth's stratospheric ozone layer and substantially lower global warming potential than fully halogenated chlorofluorocarbons.

SUMMARY OF THE INVENTION

The present invention provides improved microcellular and ultramicrocellular polymeric materials containing an environmentally more favorable inflatant. The improvement comprises selecting the inflatant from the group consisting of hydrofluorocarbon compounds having the empirical formula, $C_nF_{2n+1}H$, wherein n is an integer from 2 to 5. Preferably, the ultramicrocellular material is composed of a polymer selected from the group consisting of polypropylene, polyethylene, and poly(ethylene terephthalate), while the microcellular material is composed of poly(vinyl chloride). More preferably, the polymer is poly(ethylene terephthalate) and the inflatant is pentafluoroethane or 1,1,1,2,3,3,3-heptafluoropropane. The microcellular and ultramicrocellular materials may be in the form of staple fiber, filaments, or sheets.

DETAILED DESCRIPTION OF THE INVENTION

The present invention relates to microcellular and ultramicrocellular polymeric materials containing hydrofluorocarbon inflatants. These inflatants have zero potential to deplete the earth's stratospheric ozone layer and substantially lower global warming potential than fully halogenated chlorofluorocarbons.

Those skilled in the art are aware of flash-spinning methods for producing microcellular and ultramicrocellular polymeric materials, and such methods may be used in the present invention. These materials may be in such forms as, for example, sheets, filaments or staple fiber. In known flash-spinning processes, as described in the aforementioned U.S. Pat. Nos. 3,227,784 and 3,375,212, a solution of a synthetic organic film-forming polymer in an activating liquid is first prepared. The solution is subsequently extruded into a region of substantially lower pressure and temperature, wherein the activating liquid rapidly vaporizes, cooling the solution to a temperature at which the polymer precipitates and freezes in orientation.

The class of polymers suitable for preparing microcellular and ultramicrocellular structures is well known in the art. These polymers include polyolefins such as polyethylene and polypropylene, polyamides such as nylon-66, polyesters such as poly(ethylene terephthalate), and halogenated polymers such as poly(vinyl chloride). By the term "polyolefin", it is meant any of a series of largely saturated open chain polymeric hydrocarbons composed only of carbon and hydrogen. By the term "polyethylene", it is meant homopolymers of ethylene and copolymers, wherein at least 80% by weight of the recurring units are ethylene units. By the term "polypropylene", it is meant homopolymers of propylene and copolymers, wherein at least 80% by weight of the recurring units are propylene units. In the present invention, poly(ethylene terephthalate) is preferably used.

The class of suitable activating liquids for the flash-spinning of such structures is also well known. The activating liquid's primary purpose is to generate the cells upon flash evaporation and such liquids generally have the following properties:

a) a boiling point of at least 10° C., and preferably at least 60° C. below the melting point of the polymer used, b) is substantially unreactive with the polymer during mixing and extrusion, c) dissolves less than 1% of the polymer at or below the boiling point of the solvent, and d) is capable of forming a homogeneous solution with the polymer at elevated temperatures and pressures. Suitable activating liquids include, for example, methylene chloride and trichlorofluoromethane.

If polyethylene or polypropylene is used, the solution may also include a solid nucleating agent to assist in providing a sufficient number of bubble nuclei at the specific instant of extrusion of the solution. These known nucleating agents include, for example, fumed silica, available as "Cab-O-Sil" from Cabot Corporation, kaolin, and talc. In addition, the solution may contain such known flash-spinning additives, as dyes, ultraviolet light stabilizers, antioxidants, and reinforcing particles, etc.

As described in Parrish, U.S. Pat. No., 3,375,211 and Bonner, U.S. Pat. No. 3,375,212, the disclosures of which are hereby incorporated by reference, there are generally two methods for introducing an inflatant into microcellular and ultramicrocellular structures. Either of these methods may be used to introduce the inflatants of the present invention. These methods may be performed by a batch, i.e., non-continuous process, or a continuous process.

One method, which is now commonly referred to as the "post-inflation" method, generally involves treating the previously formed polymeric structure with a plasticizing agent which plasticizes, i.e., swells, the cell walls, and a specific inflatant. The plasticizing agent is then quickly removed leaving the inflatant trapped within the cells. When the cells are subsequently exposed to air, an osmotic pressure gradient forms allowing air to penetrate and inflate the cells, while the inflatant remains substantially trapped within the cells.

Another method, which is now commonly referred to as the "spun-in inflation" method, is a flash-spinning procedure which generally involves mixing the polymer, inflatant, and activating liquid in a pressure vessel to form a spinnable solution. The solution is then extruded through an orifice into a region of substantially lower pressure and temperature to form the polymeric structure.

It is known that suitable inflatants for microcellular and ultramicrocellular materials must have certain minimum properties. The hydrofluorocarbon inflatants of the present invention have such properties which include the following.

a) The inflatant must be substantially "impermeant". By the term "impermeant", as used herein, it is meant that the inflatant's permeability coefficient for diffusion through the cell walls is not only less than air at 25° C., but that the inflatant is also incapable of permeating the same cell walls at room temperature, e.g. below 40° C., at such a rate that 50% or more of the inflatant will diffuse into an air atmosphere within one day's time, preferably one month's time or longer.

b) The inflatant must be capable of generating a vapor pressure of at least 30 mm Hg at a temperature below the softening point of the polymer.

c) Since the rate of permeation of the inflatant increases as its diffusivity and solubility increase, the inflatants should have as large a molecular size as possible, consistent with the 30 mm Hg minimum vapor pressure, and should have substantially no solvent power or affinity for the confining polymer cell walls.

The key improvement of the present invention is using a hydrofluorocarbon compound having the empirical formula, $C_nF_{2n+1}H$, wherein n is an integer from 2 to 5, as the inflatant. Specific hydrofluorocarbon compounds include, for example, pentafluoroethane and 1,1,1,2,3,3,3-heptafluoropropane. The manufacture of these inflatants may result in mixtures of the inflatant's structural isomers which would also be suitable.

The hydrofluorocarbon inflatants of the present invention represent a distinct group of hydrofluorocarbon compounds. Although, there are hundreds of available hydrofluorocarbon compounds, it was found that only those compounds having the empirical formula, $C_nF_{2n+1}H$, wherein n is an integer from 2 to 5, were effective inflatants and have desirable environmental properties. The following Table I illustrates significant properties of poly(ethylene terephthalate) ultramicrocellular fiber containing hydrofluorocarbon inflatants of the invention, (pentafluoroethane or 1,1,1,2,3,3,3-heptafluoropropane), comparative known inflatants (perfluorocyclobutane or sulfur hexafluoride), and hydrofluorocarbon inflatants, outside the scope of the present invention.

TABLE I

| Inflatant | Formula | *Thickness Recovery | *Retention of Inflatant |
|---|---|---|---|
| Perfluorocyclobutane (FC-318)** | $C_4F_8$ | 82% | 84% |
| Pentafluoroethane (HFC-125) | $C_2F_5H$ | 76% | 87% |
| 1,1,1,2,3,3,3-Heptafluoropropane (HFC-227ea) | $C_3F_7H$ | 88% | 81% |
| Sulfur Hexafluoride (SF$_6$) | $SF_6$ | 97% | 90% |
| 1,1,1,2-Tetrafluoroethane (HFC-134A) | $C_2F_4H_2$ | 28% | 17% |
| 1,1,2,2-Tetrafluoroethane (HFC-134) | $C_2F_4H_2$ | 33% | 12% |
| 1-Chloro-1,2,2,2-tetrafluoroethane (HCFC-124) | $C_2F_4ClH$ | 38% | 35% |
| 2-Trifluoromethyl-1,1,1,3,4,5,5,5-nonafluoropentane (HFC-53-12) | $C_6F_{12}H_2$ | 6% | 20% |

*Thickness Recovery/Retention of Inflatant - These measurements were the results of a 200 psi Static Load testing procedure which is further described under the section, "Testing Methods", infra.
**Parenthetic Designations - These designations, CFC-318, HFC-125, etc., refer to abbreviations for the chemical formulas of the inflatants.

Preferably, the inflatants, pentafluoroethane and 1,1,1,2,3,3,3 - heptafluoropropane are used, because as shown in Table I, these inflatants allow poly(ethylene terephthalate) ultramicrocellular fiber to demonstrate greater than 70% thickness recovery and 80% retention of inflatant. Such properties are ideal for applications where heavy loads are supported by poly(ethylene terephthalate) ultramicrocellular materials.

All of the inflatants of the present invention are particularly desirable because, if released into the earth's atmosphere, they are environmentally more favorable than fully halogenated chlorofluorocarbon (CFC) inflatants. It is widely believed that CFCs' environmental hazards may be attributed to two critical factors. The first factor is the weight percentage of chlorine in the CFC compound. The second factor is the stability, or atmospheric lifetime, of the CFC compound.

The CFC compound is so stable that it often penetrates into the earth's stratosphere where chlorine atoms are eventually released to destroy ozone molecules. As a result, new halocarbon compounds having one or more hydrogen atoms, hydrochlorofluorocarbons (HCFCs), have been developed. Since these HCFC compounds contain hydrogen, they are subject to destruction in the atmosphere through dehydrohalogenation reactions, and consequently have a shorter atmospheric lifetime than CFCs. However, despite this characteristic, HCFCs still have some ozone-depletion potential due to the presence of chlorine. In contrast, the inflatants of the present invention belong to a class of halocarbon compounds having a hydrogen atom and no chlorine atoms, often referred to as hydrofluorocarbons (HFCs). Since the hydrofluorocarbon inflatants of the present invention do not contain any chlorine atoms, they have zero ozone-depletion potential. Furthermore, since these hydrofluorocarbon inflatants also contain a hydrogen atom, the inflatant's atmospheric lifetime is reduced to the extent that it does not significantly contribute to ground-level smog and global warming.

Testing Methods

The Thickness Recovery, Inflatant Content, and Retention of Inflatant of poly(ethylene terephthalate) inflated ultramicrocellular fibers were determined by the following procedures.

Thickness Recovery

Samples of the fiber having dimensions greater than 2"×2" were taped to a metal plate measuring 4"×4"×¼" until the plate was covered with a parallel, touching array of fibers. The plate was then turned 90°, and a second layer of fibers was placed on the plate whereby, the fiber axis of the second layer was at a right angle to the first layer.

The initial thickness of ($T_i$) of the fibers was then measured using an Ames gauge. The plate was then inserted under the ram of a Static Load tester which delivered a load of 200 psi to the sample fibers. The 200 psi load was applied for 64.5 hours and then removed. After a recovery period of 3 days, the final thickness ($T_f$) of the fibers was measured and the Thickness Recovery (%) was calculated by the following formula.

$$\text{Thickness Recovery (\%)} = \frac{\text{Final Thickness } (T_f)}{\text{Initial Thickness } (T_i)} \times 100$$

Inflatant Content/Retention of Inflatant

A piece of aluminum foil was weighed on a Mettler balance and recorded as Weight "A". At least 0.04 grams of a sample fiber was placed on the aluminum foil and then weighed with the foil. This weight was recorded as Weight "B". The foil was then folded over about ⅛ on each of its 3 open sides. The foil was then inserted between the platens of a Carver hot press having a temperature of 280° C. The platens were closed by slowly pumping the lever of the press until the gauge pressure was about 5000 psig. After 45 seconds, the platens were opened and the foil was removed with tweezers. The foil was cooled and weighed to the nearest 0.0001 gram. This weight was recorded as Weight "C" and the Inflatant Content (%) of the sample was then calculated by the following formulas.

Weight of Polymer = Weight C − Weight A
Weight of Inflatant = Weight B − Weight C $$\text{Inflatant Content (\%)} = \frac{\text{Weight of Inflatant}}{\text{Weight of Polymer}} \times 100$$

A fresh sample of the fiber was then subjected to the above-described 200 psi static load test and the sample's inflatant content was measured. The sample's Retention of Inflatant (%) was then calculated by the following formula.

$$\text{Retention of Inflatant (\%)} = \frac{\text{Inflatant Content of Static Load Sample}}{\text{Inflatant Content of Control Sample}} \times 100$$

The following examples illustrate the present invention. Examples 3–8 are comparative examples and outside the scope of the invention. Although the examples illustrate batch processes involving equipment of relatively small size, they can be scaled-up and converted to continuous processes.

EXAMPLES

Poly(ethylene terephthalate) ultramicrocellular fiber which did not contain an inflatant was first prepared by the following flash-spinning process.

In a dry box flushed with dry nitrogen, a three liter nickel autoclave was charged with 1600 grams of poly(ethylene terephthalate) having a relative viscosity (HRV) of 72.1 and 1000 ml of dry methylene chloride. The autoclave was fitted with a spinneret orifice having a length and diameter of 0.008 inches (0.020 mm). The spinneret was closed with a movable closure. The assembled unit was then removed from the dry box, wrapped with electrical heaters and placed inside an insulated, ventilated box. The autoclave was rotated about its center of gravity to mix its dissolving contents as its internal temperature was raised to the desired 230° C. The autoclave was then positioned and 1000 psig of nitrogen pressure was applied to the vapor space above the solution. The spinneret was opened and the ultramicrocellular fiber collected as it fell freely into the air. The ultramicrocellular fiber had a HRV of 38.

The fiber was then subjected to the following post-inflation process, wherein the fiber was treated with a plasticizing agent and the desired inflatant.

A one liter resin kettle was fitted with a thermometer, a dry ice condenser, and a gas inlet port. About 150 ml of methylene chloride (plasticizing agent) was placed in the kettle, the condenser was filled with dry ice, and the desired inflatant was admitted, usually as a gas through a regulator and pressure reduction device, and through the gas inlet. As the inflatant gas condensed on the cold finger and the refluxate returned to the kettle, the methylene chloride cooled and became saturated with inflatant at one atmosphere pressure. The admission of the inflatant was continued until the temperature of the saturated solution in the kettle had been reduced to the desired point, usually in the range of 0°-15° C. A skein of the ultramicrocellular fiber was weighed and introduced, along with a metal screen to submerge it, into the cold but refluxing solution of inflatant. After the desired time had elapsed, usually about 5 to 15 minutes, the skein was removed and quickly submerged in 55° C. water for about 30 seconds. (This procedure was done to quickly deplasticize the fiber and trap the inflatant inside.) The skein was then placed inside an air oven having a temperature of about 110° C. to fully inflate and equilibrate the fiber with air. The skein was then cooled and weighed to determine the amount of inflatant imbibed, and the volume of the fiber was measured by displacement of water to determine its density. All of the examples were performed by the foregoing flash-spinning and post-inflation methods under the specific conditions and with the particular inflatants shown in the following Table II. Table II also records properties of the poly(ethylene terephthalate) ultramicrocellular fiber.

ate) polymer, wherein the cells contain an inflatant, the improvement comprising selecting the inflatant from the group consisting of hydrofluorocarbon compounds having the empirical formula:

$$C_nF_{2n+1}H$$

wherein, n is an integer from 2 to 5.

2. An improved ultramicrocellular material as defined in claim 1, wherein the inflatant is pentafluoroethane.

3. An improved ultramicrocellular material as defined in claim 1, wherein the inflatant is 1,1,1,2,3,3,3-heptafluoropropane.

4. An improved ultramicrocellular material as defined in claim 1, wherein the material is in the form of staple fiber.

5. An improved ultramicrocellular material as defined in claim 1, wherein the material is in the form of filaments.

6. An improved ultramicrocellular material as defined in claim 1, wherein the material is in the form of a sheet.

TABLE II

| Example No. | Inflatant | Formula | Mol. Wt | Temp. (°C.) | Time (min.) | Inflatant Content (%) | Density (g/cc) | PP (atm) | Thickness Recovery (%) | Inflatant Retention (%) |
|---|---|---|---|---|---|---|---|---|---|---|
| 1 | HFC-125 | $C_2F_5H$ | 120 | −1 | 5 | 13.2 | 0.0138 | 0.34 | 76 | 87 |
| 2 | HFC-227ea | $C_3F_7H$ | 170 | −4 | 3.5 | 14.0 | 0.0149 | 0.28 | 88 | 81 |
| 3 | HFC-134A | $C_2F_4H_2$ | 102 | −9 | 1 | 7.8 | 0.0144 | 0.25 | 32 | 19 |
| 4 | HFC-134 | $C_2F_4H_2$ | 102 | 4 | 3 | 13.5 | 0.0130 | 0.39 | 33 | 12 |
| 5 | HCFC-124 | $C_2F_4ClH$ | 137 | 17 | 3.5 | 13.7 | 0.0149 | 0.34 | 38 | 35 |
| 6 | HFC-53-12 | $C_6F_{12}H_2$ | 302 | RT | 5 | 17.1 | — | — | 5 | 16 |
| 7 | FC-318 | $C_4F_8$ | 200 | 9 | 14 | 14.0 | 0.0159 | 0.25 | 82 | 84 |
| 8 | *$SF_6$ | $SF_6$ | 146 | *1 | *2 | 7.6 | 0.0172 | 0.20 | 97 | 90 |

*This sample was dipped with the inflatant, $SF_6$, twice:
*1 - the first dip was at a temperature in the range of −4° to −10° C. and the second dip was at a temperature in the range of −11° to −9° C.
*2 - the time for each dip was 10 minutes.
Density - grams of polymer in fiber per cubic centimeter excluding the inflatant.
PP - partial pressure of the inflatant in atmospheric units as determined by the following formula:

$$\text{Partial Pressure (PP)} = \frac{\text{Inflatant Cont.} \times \text{Density} \times 224}{\text{Molecular Weight of Inflatant}}$$

Inflatant Content, Thickness Recovery, and Retention of Inflatant - These properties were measured by the tests described under the above section, "Testing Methods".

We claim:

1. An improved ultramicrocellular material comprising closed polyhedral cells of poly(ethylene terephthal-